United States Patent [19]

Koshii et al.

[11] Patent Number: 5,013,781

[45] Date of Patent: May 7, 1991

[54] GASKET/PACKING MATERIAL WITH EXCELLENT ADHESIVENESS AND RESISTANCE TO COOLANTS

[75] Inventors: Taro Koshii, Chiba; Tetsuo Amemiya, Ichihara, both of Japan

[73] Assignee: Dow Corning Toray Silicone Company, Ltd., Tokyo, Japan

[21] Appl. No.: 85,051

[22] Filed: Aug. 13, 1987

[30] Foreign Application Priority Data

Aug. 25, 1986 [JP] Japan ................................ 61-198380

[51] Int. Cl.$^5$ ............................................. C09L 83/06
[52] U.S. Cl. .................................... 524/864; 524/783; 524/785; 524/786; 524/863; 528/22; 528/33; 528/34; 528/901
[58] Field of Search ................... 528/901, 18, 34, 33, 528/22; 524/430, 431, 432, 424, 783, 786, 785, 860, 863, 864

[56] References Cited

U.S. PATENT DOCUMENTS

| | | |
|---|---|---|
| 3,829,529 | 8/1974 | Lengnick ............................ 528/901 |
| 4,191,817 | 3/1980 | Schiller et al. . | |
| 4,257,932 | 3/1981 | Beers ................................... 528/901 |
| 4,399,267 | 8/1983 | Bosch et al. ......................... 528/18 |
| 4,485,206 | 11/1984 | Inoue et al. ......................... 524/719 |
| 4,503,210 | 3/1985 | Von Au et al. ..................... 528/33 |
| 4,514,529 | 4/1985 | Beers et al. ......................... 523/200 |
| 4,680,363 | 7/1987 | Beers ................................... 528/901 |
| 4,689,363 | 8/1987 | Inoue et al. ......................... 524/394 |

FOREIGN PATENT DOCUMENTS 46-11272 3/1971 Japan .

*Primary Examiner*—John C. Bleutge
*Assistant Examiner*—B. Dean, Jr.
*Attorney, Agent, or Firm*—Roger H. Borrousch

[57] ABSTRACT

A gasket and packing material which exhibits excellent adhesiveness to substrates and resistances to degradation of properties when exposed to hot hydrocarbon oils and coolants such as used in an automobile radiator are made by curing a composition which contains polydimethylsiloxane, an organopolysiloxane having $R'_3SiO_{0.5}$ and $SiO_2$ units or $R'_3SiO_{0.5}$, $R'_2SiO$, and $SiO_2$ units, an inorganic filler, an alkoxysilane adhesion promoter, and a ketoxime silicon compound crosslinker.

2 Claims, No Drawings

GASKET/PACKING MATERIAL WITH EXCELLENT ADHESIVENESS AND RESISTANCE TO COOLANTS

BACKGROUND OF THE INVENTION

1. Field of the Invention

The present invention relates to a silicone gasket/packing material composition which cures at room temperature to produce an elastomeric product useful as a gasket or packing material.

2. Prior Art

A number of fixed-shape materials are used in the art as gasket and packing materials, for example, cork, asbestos paper, semimetallics, cork rubber, etc., for use in the automobile industry, electrical machinery and appliance industry and machine industry. However, these fixed-shape gasket and packing materials are expensive, their inventory control is troublesome, and they cannot be used for parts in which three surfaces meet.

On the other hand, a method is employed in the automobile industry for sealing in the vicinity of the engine in which a room temperature-curing silicone rubber composition is applied in its uncured state to a sealing surface. Curing at room temperature with pressing produces a silicone rubber layer adhering to the substrate at the sealing surface. Adhesive room temperature-curing silicone rubber compositions have been proposed for use in this application for example, refer to Japanese Patent Publication Number 46[1971]-11272, published Mar. 22. 1971, to Ichiro Hashishiro and Susumu Horii. This publication describes the use of an adhesive, room-temperature-curable silicone rubber composition useful in the automobile industry, especially as gasket material and packing for car engines. However, the products produced from the compositions of Hashishiro et al are not resistant to hot hydrocarbon oil, with the result that it suffers from oil leaks in long-term usage. For this reason, such compositions are unsatisfactory as a gasket material or packing material.

Schiller et al in U.S. Pat. No. 4,191,817, issued Mar. 4, 1980 describes curable compositions which can be stored under anhydrous conditions but when exposed to atmospheric moisture cross-link to form elastomers. The compositions of Schiller et al consist to diorganopolysiloxanes having terminal condensable groups, a silicon compound containing at least three hydrolyzable groups which are either amino bonded to silicon via a silicon-nitrogen bond and oxime bonded to silicon via a silicon-oxygen bond, and as an adhesion additive, an organosilicon compound which has at least one amino group and at least one silicon-oxygen bond. These compositions of Schiller et al can contain fillers and other components including organopolysiloxane resins such as those consisting of $(CH_3)_3SiO_{0.5}$ and $SiO_2$ units. Although the adhesion of the compositions of Schiller et al are improved over having no additive, such compositions are deficient when exposed to coolant used in automobile radiators.

PROBLEMS TO BE SOLVED BY THE INVENTION

However, gasket and packing materials formed from the aforesaid silicone rubber compositions suffer from a poor resistance to hot hydrocarbon oils, for example, engine oil and gear oil, and from a poor resistance to the cooling liquid used as radiator coolant. As a consequence, oil and coolant leaks develop during long-term use, and the demands which must be fulfilled by a gasket/packing material are not fully satisfied as a result.

Accordingly, the present inventors carried out investigations with a view to eliminating these problems, and the present invention was developed as a result.

SUMMARY

An object of the present invention is to provide a gasket/packing material composition which has an excellent adhesiveness and long-term resistance to hot hydrocarbon oils and coolants, and so does not suffer from oil and coolant leaks.

Means Solving the Problems and Function Thereof

The aforesaid object is accomplished by means of a room temperature-curing composition comprising a product obtained by mixing (i) 100 weight parts of an essentially linear polydiorganosiloxane having the silicon-bonded hydroxyl group at the molecular terminals and having a viscosity of 0.0001 to 0.1 $m^2/s$ at 25° C., the organic radicals being a monovalent radical selected from the group consisting of monovalent hydrocarbon radicals, halogenated monovalent hydrocarbon radicals, and cyanoalkyl radicals, (ii) 1 to 50 weight parts organopolysiloxane composed of $R'_3SiO_{0.5}$ and $SiO_2$ units or $R'_3SiO_{0.5}$, $R'_2SiO$, and $SiO_2$ units where each $R'$ represents a monovalent organic radical selected from the group consisting of monovalent hydrocarbon radicals, halogenated monovalent hydrocarbon radicals, and cyanoalkyl radicals, and in which the $R'_3SiO_{0.5}$ unit/$SiO_2$ unit molar ratio is 0 5:1 to 1.5:1; (iii) 5 to 300 weight parts inorganic filler; (iv) 0.1 to 10 weight parts alkoxysilane with the general formula

in the formula, $R''$ is a monovalent organic group selected from the group consisting of alkyl groups, alkenyl groups, oxime groups, monovalent organic groups which contain the epoxy group, monovalent organic groups which contain the acryloxy group, and monovalent organic groups which contain the mercapto group; a is a positive integer having a value of 0, 1, or 2; and $R'''$ is an alkyl radical; and (v) a silicon compound which contains in each molecule at least three oxime groups bonded to silicon via oxygen, said silicon compound being present in a quantity sufficient to make the composition of components (i) through (iv) curable at room temperature to an elastomeric solid which exhibits resistance to loss of properties upon exposure to radiator coolant.

DESCRIPTION OF THE PREFERRED EMBODIMENTS

The polydiorganosiloxane of component (i) has an essentially linear chemical structure, that is, it has a linear or slightly branched chain. The chain terminals contain the silicon-bonded hydroxyl group or a silicon-bonded hydrolyzable group. While one, two, or three such groups may be bonded to the same silicon atom, at least two such groups must be present in each molecule of this organopolysiloxane. The viscosity of this organopolysiloxane is to fall within the range of 0.0001 to 0.1 $m^2/s$ at 25° C. and preferably 0.001 to 0.1 $m^2/s$ at 25° C.

The organic radicals bonded to silicon atoms in (i) can be monovalent hydrocarbon radicals, halogenated monovalent radicals, and cyanoalkyl radicals. Examples of organic radicals bonded to silicon atoms are monovalent hydrocarbon radicals such as alkyl radicals, such as methyl, ethyl, isopropyl, hexyl, and decyl radicals, cycloalkyl radicals, such as cyclohexyl and ucyclpentyl radicals, alkaryl radicals such as benzyl and beta-phenylethyl radicals, aryl radicals such as phenyl, 4-biphenylyl, naphthyl, tolyl, and xylyl radicals; the halogenated derivatives of the monovalent hydrocarbon radicals; and cyanoalkyl radicals such as beta-cyanoethyl, gamma-cyanopropyl, and beta-cyanobutyl radicals. One molecule can contain one or more different radicals. Preferred organic radicals are methyl and the polydiorganosiloxane is preferably composed of dimethylsiloxane units. The most preferred polydiorganosiloxanes are the polydimethylsiloxanes having a viscosity of from 0.005 to 0.05 $m^2/s$ at 25° C.

Component (ii) functions in combination with component (iv) to improve the hydrocarbon oil and coolant (chemical) resistance, and in the present invention, ideally has the structure specified. Said component (ii) is miscible with component (i), and exhibits an excellent effect by virtue of its excellent dispersion and incorporation into the network structure by means of chemical bonding.

Component (ii) comprises an organopolysiloxane which is composed of $R'_3SiO_{0.5}$ units and $SiO_2$ units, or which is composed of $R'_3SiO_{0.5}$ units, $R'_2SiO$ units and $SiO_2$ units, and in each case the $R'_3SiO_{0.5}$ unit/$SiO_2$ unit molar ratio must be 0.5:1 to 1.5:1. R' is a monovalent organic group as represented by alkyl groups such as methyl, ethyl, propyl, etc; cycloalkyl groups such as cyclohexyl, etc.; alkenyl groups such as vinyl and allyl, etc.; aryl groups such as phenyl and tolyl, etc.; and these groups in which the hydrogen atoms have been replaced in part by, for example, halogen atoms, etc. These siloxanes can be synthesized, for example, by the reaction of the appropriate selection from among $R'_3SiCl$, $R'_2SiCl_2$, $R'_3SiOSiR'_3$, $Si(OR)_4$, and sodium silicate. In this case, gelation tends to occur quite easily with the use of $Si(OR)_4$, and as a consequence the cohydrolysis reaction is in general preferably conducted at low temperatures in the presence of a large quantity of a lower alcohol (ethanol, propanol, butanol, etc.). Preferred organopolysiloxanes of (ii) are those in which R' is methyl and the molar ratio of $R'_3SiO_{0.5}$ unit/$SiO_2$ unit is from 0.7:1 to 1:1 and those in which R' is methyl and the molar ratio of $R'_3SiO_{0.5}$ units/ $R'_2SiO$ units/$SiO_2$ units is 0.7–1:0.01–0.5:1.

Component (ii) is added within the range of 1 to 50 weight parts, preferably 3 to 45 weight parts per 100 weight puarts component (i) and more preferred 10 to 45 weight parts per 100 weight parts component (i). This is because the resistance of the gasket or packing material to oil and coolant drops off at below 1 weight part, while the tensile elongation is reduced and the modulus becomes too high when 50 weight parts is exceeded.

The inorganic filler comprising component (iii) is added in order to regulate the viscosity and fluidity of the gasket/packing material of the present invention to within the appropriate ranges, and also in order to generate the mechanical properties of a cured rubber. Silica fillers are representative examples of such inorganic fillers. The silica filler can be either a reinforcing silica filler or a nonreinforcing silica filler. The reinforcing silica fillers include silica aerogel, silica xerogel, fumed silica, precipitated silica, and fumed and precipitated silicas which have been hydrophobicized with hexamethyldisilazane or trimethylchlorosilane. The nonreinforcing silica fillers include crushed and pulverized quartz, diatomaceous earth, and similar materials. Fumed silica with a specific surface area of 130 to 300 m2/g is preferred from the standpoints of fluidity and the post-cure rubber properties. Carbon black is another reinforcing filler which can be used in the compositions of this invention.

Examples of nonreinforcing fillers are calcium carbonate. zinc carbonate, magnesium oxide, aluminum hydroxide, iron oxide, zinc oxide, titanium oxide, and powdered mica.

While the quantity of addition of this component falls within the range of 5 to 300 weight parts per 100 weight parts of component (i), the optimal quantity is to be suitably selected based on a consideration of the viscosity and fluidity of the target composition, the mechanical properties of the cured rubber, and the type of filler. Preferably the inorganic filler is added in an amount of from 5 to 200 weight parts and more preferred is 10 to 150 weight parts per 100 weight parts of component (i). Reinforcing silica fillers and carbon black are generally added at 5 to 30 weight parts per 100 weight parts component (i), and nonreinforcing silica fillers are preferably added at 15 to 200 weight parts. This component can be combinations of two or more types, and two or more fillers.

Component (iv) functions as an adhesion promoter, and in particular. interacts synergistically with component (ii) to impart resistance to hot coolant and hot hydrocarbon oil. It also functions to provide a complete maintenance of the adhesive strength even after immersion in these agents. Component (iv) is an alkoxysilane in which R" in the above formula is an alkyl group such as methyl, ethyl, propyl, etc.; an alkenyl group such as vinyl, allyl, isopropenyl, etc.; an oxime group such as methyl ethyl ketoxime, etc.; a monovalent organic group which contains the epoxy group for example, gamma-glycidoxypropyl. beta-(3.4-epoxycyclohexyl)ethyl, etc.; a monovalent organic group which contains the acryloxy group, for example, methacryloxy, acryloxy, etc., or a monovalent organic group which contains the mercapto group, for example, gamma-mercaptopropyl, etc. R''' is an alkyl radical such as methyl, ethyl, or propyl. Said alkoxysilanes are exemplified by methyltrimethoxysilane,
methyltriethoxysilane,
vinyltrimethoxysilane,
vinyltriethoxysilane,
allyltrimethoxysilane,
di(methyl ethyl ketoxime)diethoxysilane,
di(methyl ethyl ketoxime)dimethoxysilane,
(methyl ethyl ketoxime)triethoxysilane,
gamma-glycidoxypropyltrimethoxysilane,
gamma-glycidoxypropylmethyldiethoxysilane,
beta-(3.4-epoxycyclohexyl)ethyltrimethoxysilane,
gamma-methacryloxypropyltrimethoxysilane,
gamma-mercaptopropyltrimethoxysilane,
gamma-mercaptopropylmethyldimethoxysilane,
tetraethoxysilane,
ethyltrimethoxysilane, and
3,3,3-trifluoropropyltrimethoxysilane.

Among these, alkenyl-containing silanes are preferred, and silanes which contain the oxime group are particularly preferred. Component (iv) is to be added at 0.1 to 10 weight parts, preferably 1 to 5 weight parts per 100 weight parts component (i), and more preferred from 1 to 3 weight parts per 100 weight parts of component (i).

Component (v) is a crosslinker which crosslinks the composition consisting of components (i) through (iv). Component (v) is a silicon compound which contains in each molecule at least three oxime groups bonded to silicon via the oxygen atom. These silicon compounds are exemplified by methyltris(methyl ethyl ketoxime)silane,
vinyltris(methyl ethyl ketoxime)silane,
phenyltris(methyl ethyl ketoxime)silane,
methyltris(diethyl ketoxime)silane, and
tetrakis(methyl ethyl ketoxime)silane.

These silicon compounds can be used singly or as the combination of two or more types. While the quantity of component (v) is not specifically restricted, it is to be that quantity which makes the composition of components (i) through (iv) curable at room temperature. The quantity of addition necessary to obtain an advantageous shelf life and provide a one package composition and also provide a suitable curing time is from 5 to 30 weight parts per 100 weight parts component (i). The preferred amount of component (v) is from 10 to 25 weight parts per 100 weight parts of component (i).

The gasket/packing material of the present invention is produced by mixing the above components (i), (ii), (iii), (iv), and (v), as necessary along with those additives typically used for room temperature-curing silicone rubbers, for example, hydrophobicizing agents for hydrophilic silicas as exemplified by diphenylsilanediol or hexamethyldisilazane; heat stabilizers such as cerium oxide, cerium hydroxide, and fumed titanium dioxide; various pigments; flame retardants such as platinum, manganese carbonate, azobisisobutyronitrile, etc.; oil-resistance improvers such as zinc borate; and so forth. In those situations where it is desired to obtain a shelf stable composition which can be stored in a single package, it is desirable to mix the ingredients under conditions which prevents the inclusion of moisture into the mixture. The use of a curing catalyst, such as an organo tin carboxylate, for example dibutyl tin diacetate, dibutyl tin dioctoate, and dibutyl tin dilaurate, can be advantageous to reduce the curing time or to provide rapid skin over times. Also some combinations of ingredients may cure slower than practical and a curing catalyst would be advantageously used. Curing at room temperature affords a rubber which bonds to the substrate in contact with it during curing and which has an excellent resistance to hot hydrocarbon oil and hot coolant. As a consequence, this oil-resistant gasket/packing material of the present invention finds utility as a gasket material for automobile engine oil pans, as a headcover gasket/packing material for marine diesel engines, as a packing material for automobile transmission pans, as a packing material for rotary engines, and as a packing material for automobile radiator components.

EXAMPLES

Examples are given below: in the examples, parts=weight parts and Me represents the CH3 group.

EXAMPLE 1

Gasket/packing compositions were obtained by combining and mixing 100 parts silanol-terminated polydimethylsiloxane having a viscosity of 0.015 m$^2$/s at 25° C., 15 parts methylpolysiloxane composed of Me$_3$SiO$_{0.5}$ and SiO$_2$ units (Me$_3$SiO$_{0.5}$/SiO$_2$ molar ratio=0.8, hydroxyl group content=5 wt %), 12 parts fumed silica having a specific surface area of 200 m$^2$/g, 14 parts vinyltris(methyl ethyl ketoxime)silane and 4 parts tetrakis(methyl ethyl ketoxime)silane as the crosslinker, and 2 parts of the silane reported in Table 1 as the adhesion promoter. Each composition was degassed and then filled into aluminum foil tubes. Each composition was then squeezed out from its tube and inserted in a thickness of 1 mm over an adhesion area of 25 mm×25 mm between 2 cold-rolled copper plates (length=100 mm. width=25 mm, thickness=1 mm) which had been prepared in advance. Adhesion test specimens were obtained by curing at room temperature for 7 days. Other test specimens were similarly prepared using aluminum plates with the same dimensions. The test specimens were immersed for 10 days at 120° C. in a coolant which was a 1-to-1 mixture of water and long life coolant (LLC) meeting JIS K-2234 (radiator coolant, brand name: Toyota Pure Castle Long-Life Coolant from Toyota Motor Corp.). The adhesive strength in tensile shear was then measured, and the results are reported in Table 1.

For comparison, compositions were also prepared in which 2 parts amino-containing silane was added as the adhesion promoter in place of the silanes specified above. These compositions were evaluated as above and these results are also reported in Table 1.

A composition was also prepared which lacked any silane adhesion promoter, and it was also evaluated as above. These results are also reported in Table 1.

TABLE I

| EXPERIMENT NUMBER | THE PRESENT INVENTION | | | | | COMPARISON EXAMPLES | | |
|---|---|---|---|---|---|---|---|---|
| | 1 | 2 | 3 | 4 | 5 | 6 | 7 | 8 |
| Silane Adhesion Promoter | (1)* | (2)* | (3)* | (4)* | (5)* | (6)* | (7)* | — |
| Adhesive Strength for iron. (kg/cm$^2$) | 7.5 | 8.7 | 7.1 | 8.9 | 7.1 | 2.5 | 2.9 | 2.1 |
| Adhesive Strength for aluminum. (kg/cm$^2$) | 7.1 | 8.1 | 7.9 | 8.1 | 7.9 | 2.1 | 2.4 | 2.4 |

*(1) = methyltrimethoxysilane
(2) = vinyltrimethoxysilane
(3) = gamma-glycidoxypropyltrimethoxysilane
(4) = di(methyl ethyl ketoxime)diethoxysilane
(5) = gamma-mercaptopropyltrimethoxysilane
(6) = N-(beta-aminoethyl)-gamma-aminopropyltrimethoxysilane
(7) = gamma-aminopropyltriethyoxysilane

EXAMPLE 2

A gasket/packing composition was prepared by combining and mixing 100 parts silanol-terminated polydimethylsiloxane having a viscosity of 0.015 m$^2$/s at 25° C., 40 parts methylpolysiloxane composed of Me$_3$SiO$_{0.5}$ units, Me$_2$SiO units, and SiO$_2$ units (Me$_3$SiO$_{0.5}$ unit:Me$_2$SiO unit:SiO$_2$ unit molar ratio=0.8:0.2:1.0, hydroxyl group content=3 wt %), 18 parts of a fumed silica with a specific surface of 130 m$^2$/g, 4 parts methyltris(methyl ethyl ketoxime)silane, 11 parts vinyltris(methyl ethyl ketoxime)silane, 0.2 parts dibutyltin dilaurate as cross-linking catalyst and 2 parts gamma-glycidoxypropyltrimethoxysilane as adhesion promoter. This composition was then degassed and filled into an aluminum foil tube. This composition was then squeezed out of the aluminum foil tube, and a 2 mm thick sheet was prepared by curing for 7 days at room temperature. This sheet was immersed at 120° C. for 10 days in a 1-to-1 mixture of water and the same long-life coolant as used in Example 1, and the rubber properties were then measured in accordance with JIS K-6301. These results are reported in Table 2.

For comparison, a composition was prepared using 40 parts silanol-terminated polydimethylsiloxane having a viscosity of 0.015 m$^2$/s at 25° C. in place of the polysiloxane composed of Me$_3$SiO$_{0.5}$ units, Me$_2$SiO units and SiO$_2$ units. This composition was evaluated as described above and the results are reported in Table 2.

EXAMPLE 3

A gasket/packing composition was prepared by combining and mixing 100 parts silanol-terminated polydimethylsiloxane having a viscosity of 0.012 m$^2$/s at 25° C., 33 parts methylpolysiloxane composed of Me$_3$SiO$_{0.5}$ units and SiO$_2$ units (Me$_3$SiO$_{0.5}$/SiO$_2$ molar ratio=0.8:1, hydroxyl group content=5 wt %), filler as reported in Table 3, 23 parts vinyltris(methyl ethyl ketoxime)silane as crosslinker and 2 parts di(methyl ethyl ketoxime)diethoxysilane as adhesion promoter. This composition was degassed and then filled into an aluminum foil tube. The composition was then squeezed out from the aluminum foil tube, and a 2 mm thick sheet was produced by curing at room temperature for 7 days. This sheet was immersed for 10 days at 120° C. in SD10W-30 oil (Toyota Pure Castle Motor Oil Clean Super 10W-30-SD from Toyota Motor Corp.), and the rubber properties were then measured in accordance with JIS K-6301. These results are reported in Table 3. This sheet was also immersed at 120° C. for 10 days in a 1-to-1 mixture of water and long-life coolant meeting JIS K-2234 as used in Example 1. The rubber properties of the sheet were then measured in accordance with JIS K-6301. and these results are also reported in Table 3.

For comparison, a composition was prepared by the same procedure as above, but omitting the inorganic filler. It was evaluated by the same procedure as above, and these results are reported in Table 3. In this case of no filler addition, the absolute values of the rubber properties were low, and the rubber was unsuitable for practical applications.

TABLE 2

| Experiment Number | THE INVENTION 9 | COMPARISON EXAMPLE 10 |
| --- | --- | --- |
| Composition | | |
| Component (ii) | Me$_3$SiO$_{0.5}$/Me$_2$SiO/SiO$_2$ = 0.8/0.2/1.0 hydroxyl group content = 3 wt % | silanol-terminated dimethylpolysiloxane with viscosity = 0.015 m$^2$/s |
| Component (iv) | gamma-glycidoxypropyl-trimethoxysilane | gamma-glycidoxypropyl-trimethoxysilane |
| Hardness (JIS A) | | |
| initial | 37 | 26 |
| after immersion for 10 days | 29 | 4 |
| Tensile strength (kg/cm$^2$) | | |
| initial | 38 | 17 |
| after immersion for 10 days | 21 | 1 |
| Elongation (%) | | |
| initial | 490 | 390 |
| after immersion for 10 days | 380 | 50 |

TABLE 3

| | THE INVENTION | | | | | | COMPARISON EXAMPLE |
| --- | --- | --- | --- | --- | --- | --- | --- |
| Experiment Number | 11 | 12 | 13 | 14 | 15 | 16 | 17 |
| filler | fumed silica | iron oxide | alumina | zinc oxide | silica | zinc carbonate | — |
| parts | 13 | 100 | 100 | 100 | 100 | 100 | — |
| Hardness (JIS A) | | | | | | | |
| initial | 44 | 44 | 35 | 36 | 40 | 40 | 19 |
| after immersion in SD 10W-30 oil | 31 | 34 | 25 | 23 | 27 | 24 | 11 |
| after immersion in LLC/water | 31 | 25 | 19 | 20 | 26 | 19 | 9 |
| Tensile strength (kg/cm$^2$) | | | | | | | |
| initial | 43 | 34 | 25 | 30 | 39 | 34 | 18 |
| after immersion in SD 10W-30 oil | 32 | 33 | 26 | 30 | 33 | 27 | 11 |
| after immersion in LLC/water | 32 | 29 | 20 | 21 | 26 | 20 | 9 |
| Elongation (%) | | | | | | | |
| initial | 380 | 230 | 330 | 380 | 240 | 280 | 380 |

TABLE 3-continued

| | THE INVENTION | | | | | | COMPARISON EXAMPLE |
|---|---|---|---|---|---|---|---|
| Experiment Number | 11 | 12 | 13 | 14 | 15 | 16 | 17 |
| after immersion in SD 10W-30 oil | 310 | 220 | 270 | 340 | 250 | 250 | 360 |
| after immersion in LLC/water | 380 | 350 | 350 | 480 | 300 | 360 | 430 |

Effects of the Invention

Because the gasket/packing material composition of the present invention comprises a room temperature-curing composition which consists of a polydiorganosiloxane as component (i), a specific organopolysiloxane as component (ii), inorganic filler as component (iii), and specified alkoxysilanes as component (iv), and ketoxime silanes as component (v), gasket and packing materials formed from it exhibit an excellent adhesiveness and durability and are resistant to hot hydrocarbon oil and coolant. As a consequence, oil and coolant leaks characteristically do not occur.

That which is claimed is:

1. A room temperature-curing composition consisting essentially of a product obtained by mixing
   (i) 100 weight parts of an essentially linear polydimethylsiloxane having silicon-bonded hydroxyl group at the molecular terminals and having a viscosity of 0.005 to 0.05 $m^2/s$ at 25° C.,
   (ii) 10 to 45 weight parts organopolysiloxane composed of $R'_3SiO_{0.5}$, $R'_2SiO$, and $SiO_2$ units where each $R'$ represents methyl, and in which the $R'_3SiO_{0.5}$ unit/$R'_2SiO$/$SiO_2$ unit molar ratio is 0.7-1:0.01-0.5:1,
   (iii) 10 to 150 weight parts inorganic filler,
   (iv) 1 to 3 weight parts alkoxysilane selected from the group consisting of methyltrimethyoxysilane, vinyltrimethyoxysilane, gamma-glycidoxypropyltrimethyoxysilane, di(methyl ethyl ketoxime)diethoxysilane, and gamma-mercaptopropyltrimethoxysilane, and
   (v) 10 to 25 weight parts of a silicon compound selected from the group consisting of vinyltris(methyl ethyl ketoxime)silane, methyltris(methyl ethyl ketoxime)silane, tetrakis(methyl ethyl ketoxime)silane, and mixtures thereof
   to make compositions curable at room temperature to elastomeric solids which exhibit resistance to loss of properties upon exposure to radiator coolant.

2. The composition in accordance with claim 1 in which the silicon compound is a mixture of methyltris(methyl ethyl ketoxime)silane and vinyltris(methyl ethy ketoxime)silane, the alkoxysilane is gamma- glycidoxypropyltrimethoxysilane, the inorganic filler is fumed silica, and there is also present dibutyltindilaurate.

* * * * *